United States Patent
Kopinke et al.

(10) Patent No.: US 11,103,854 B2
(45) Date of Patent: Aug. 31, 2021

(54) CORROSION-RESISTANT, REACTIVE ADSORBENT FOR TREATMENT OF CONTAMINATED WATER, METHODS FOR PRODUCING SAME AND USE THEREOF

(71) Applicant: Helmholtz-Zentrum für Umweltforschung GmbH—UFZ, Leipzig (DE)

(72) Inventors: Frank-Dieter Kopinke, Leipzig (DE); Katrin MacKenzie, Naundorf (DE); Maria Vogel, Leipzig (DE); Steffen Bleyl, Leipzig (DE); Anett Georgi, Leipzig (DE)

(73) Assignee: Helmholtz-Zentrum fur Umweltforschung GmbH—UFZ, Leipzig (DE)

( * ) Notice: Subject to any disclaimer, the term of this patent is extended or adjusted under 35 U.S.C. 154(b) by 124 days.

(21) Appl. No.: 16/170,044

(22) Filed: Oct. 25, 2018

(65) Prior Publication Data
US 2019/0060872 A1 Feb. 28, 2019

Related U.S. Application Data

(63) Continuation of application No. PCT/EP2016/059206, filed on Apr. 25, 2016.

(51) Int. Cl.
| *B01J 20/20* | (2006.01) |
| *B01J 20/32* | (2006.01) |
| *B01J 20/02* | (2006.01) |
| *B01J 20/28* | (2006.01) |
| *B01J 27/185* | (2006.01) |
| *B01J 20/30* | (2006.01) |
| *C02F 1/28* | (2006.01) |
| *C02F 101/12* | (2006.01) |

(52) U.S. Cl.
CPC .......... *B01J 20/3204* (2013.01); *B01J 20/02* (2013.01); *B01J 20/0229* (2013.01); *B01J 20/0259* (2013.01); *B01J 20/0266* (2013.01); *B01J 20/20* (2013.01); *B01J 20/28007* (2013.01); *B01J 20/28011* (2013.01); *B01J 20/3085* (2013.01); *B01J 20/3225* (2013.01); *B01J 20/3234* (2013.01); *B01J 20/3236* (2013.01); *B01J 20/3293* (2013.01); *B01J 20/3295* (2013.01); *B01J 27/1853* (2013.01); *C02F 1/283* (2013.01); *C02F 2101/12* (2013.01)

(58) Field of Classification Search
CPC ...... B01J 20/3204; B01J 20/20; C01B 32/354
See application file for complete search history.

(56) References Cited

U.S. PATENT DOCUMENTS

| 7,727,932 B2 * | 6/2010 | Baker ................... C01B 32/348 502/425 |
| 8,598,073 B2 * | 12/2013 | Gadkaree ........... B01J 20/28033 502/423 |
| 8,691,722 B2 * | 4/2014 | Gadkaree ........... B01J 20/28045 502/417 |
| 2004/0007524 A1 | 1/2004 | Noland et al. |
| 2009/0191084 A1 | 7/2009 | Liskowitz et al. |

FOREIGN PATENT DOCUMENTS

DE 102005054666 A1 5/2007

OTHER PUBLICATIONS

European Patent Office, International Search Report and Written Opinion dated Dec. 21, 2016 for PCT/EP2016/059206 filed Apr. 25, 2016, 18 pages.

* cited by examiner

*Primary Examiner* — Stuart L Hendrickson
(74) *Attorney, Agent, or Firm* — Perkins Coie LLP; Jordan Becker

(57) ABSTRACT

The invention relates to a corrosion-resistant, reactive adsorbent which is made up of element iron on a carbon carrier plus sulfur and additional phosphorus as well as a method for producing this reactive adsorbent and use thereof for removal of reductively degradable pollutants in contaminated groundwater and wastewater.

12 Claims, No Drawings

CORROSION-RESISTANT, REACTIVE ADSORBENT FOR TREATMENT OF CONTAMINATED WATER, METHODS FOR PRODUCING SAME AND USE THEREOF

CROSS REFERENCE TO RELATED APPLICATIONS

This application is a continuation of PCT/EP2016/059206 filed Apr. 25, 2016 and is incorporated herein by reference.

TECHNICAL FIELD

The invention relates to a corrosion-resistant, reactive adsorbent, comprised of elemental iron in nanoparticulate form on a carbon carrier, sulfur and also phosphorus as well as a method for producing this reactive adsorbent and use thereof for removing reductively degradable pollutants from contaminated groundwater and wastewater.

BACKGROUND

Metallic iron is known as an inexpensive and environmentally friendly reducing agent for chemical degradation of water pollutants, in particular chlorinated organic compounds, so-called chlorinated hydrocarbons (CHCs), and are described in detail in the scientific literature as well as the patent literature. One particular embodiment is nanoparticulate iron, which is known in Anglo-American countries as NZVI (nanoscale zero-valent iron).

The various embodiments of elemental iron (ZVI—zero-valent iron), including NZVI, all have two main disadvantages: they are practically inactive as an adsorbent for hydrophobic pollutants such as CHCs (chlorohydrocarbons) and have only a relatively short lifetime of the ZVI in an aqueous medium because they are consumed by reacting with water and reacting even more rapidly with dissolved oxygen (and optionally other electron acceptors, such as nitrate) according to the reactions $2\ H_2O \rightarrow Fe^{2+} + H_2 + 2\ OH^-$ (anaerobic corrosion) and $4\ Fe^0 + 3\ O_2 + 6\ H_2O \rightarrow 4\ Fe^{3+} + 12\ OH^-$ (aerobic corrosion). Valuable reduction equivalents, which are needed for degradation of pollutants, are lost through parasitic aerobic and anaerobic corrosion.

A summary of the state of the art and science reveals that ZVI and NZVI have already been investigated extensively as environmental reagents. Thus, in addition to composite materials of NZVI and colloidal activated carbon, there are also known modifications of ZVI and NZVI by either additives containing sulfur or additives containing phosphorus.

Thus, in a series of publications, Mackenzie et al. and Bleyl et al. have described a composite material of NZVI and colloidal activated carbon, which is suitable as a reactive adsorbent for in-situ treatment of contaminated groundwater. The authors have explicitly pointed out the pyrophoric properties of thermochemically created fresh composite material and describe various methods of stabilization, including treatment with water vapor, oxygen, trimethylchlorosilane, $H_2S$, HCl and acetylene—all in the gas phase (S. Bleyl, K. Mackenzie, F.-D. Kopinke: Carbo-Iron—Synthesis and stabilization of a zero-valent iron-doped colloidal activated carbon for in-situ groundwater treatment. Chemical Engineering Journal 2012, 191, 588-595). The goal of these treatments is to quench the pyrophoric properties, to create a stirrable material that is stable in air and thereby lose the least possible amount of the active reducing agent ZVI. However, most stabilization methods are carried out to the detriment of the ZVI content. It has been possible to stabilize ZVI in air by treating the fresh composite material with gaseous hydrogen chloride (K. Mackenzie, S. Bleyl, F.-D. Kopinke: Carbo-Iron—An Fe/AC composite—As an alternative to nano-iron for groundwater treatment. Water Research 2012, 46, 3817-3826). It can be seen by those skilled in the art that this deactivation method results in the formation of iron chloride on the ZVI surface. Iron chloride is water-soluble and thus can produce a stabilization effect in air but not in an aqueous medium.

The effect of sulfur-containing additives on ZVI is usually based on the formation of FeS compounds, which cover the surface of the iron particles. This results in various effects on the chemical reactivity of the material (as a reducing agent with respect to CHCs) and its corrosion rate. No long-term stabilization of ZVI has been demonstrated. Thus, for example, Hansson et al. (E. B. Hansson, M. S. Odziemkowski, R. W. Gillham: Influence of $Na_2S$ on the degradation kinetics of $CCl_4$ in the presence of very pure iron. J. Contaminant Hydrol. 2008, 98, 128-134) describe FeS coating of ZVI by treatment with sodium bisulfide (NaHS). The FeS coating initially causes passivation of ZVI for all reactions, i.e., dechlorination and corrosion. However, after a few days, progressive corrosion of the FeS shell begins, associated with an increase in the specific surface area and an increase in the ZVI reactivity. Dechlorination of tetrachloromethane yields only chloroform, i.e., the unwanted product of incomplete dechlorination. Both effects described for sulfur treatment of ZVI are a disadvantage for in-situ use with corrosion-resistant, reactive adsorbents for hydrophobic pollutants such as CHCs with a long lifetime.

Turcio-Ortega et al. (D. Turcio-Ortega, D. Fan, P. G. Tratnyek, E.-J. Kim, Y.-S. Chang: Reactivity of Fe/FeS Nanoparticles: Electrolyte Composition Effects on Corrosion Electrochemistry. Environ. Sci. Technol. 2012, 46, 12484-12492) also investigated the effects of a sulfur treatment on the reactivity and corrosion rate of Fe/FeS nanoparticles with the help of electrochemical methods. They surprisingly found that Fe/FeS corrodes more rapidly and is more sensitive to the composition of the surrounding water (e.g., chloride concentration) than untreated ZVI, which undergoes spontaneous passivation with an oxide layer in an aqueous medium. It may be assumed that a penetration of ZVI into an aquifer will result in strong reducing conditions, as a result of which microbial sulfate reduction can begin. In addition to other sulfur compounds, sulfide is formed here as the main product. This results in a "natural" sulfur modification of ZVI, which is triggered by microbial sulfate reduction. Since this sulfur modification, as described by Hansson et al. (2008) and Turcio-Ortega et al. (2012), results in accelerated ZVI corrosion, suitable measures for stabilizing ZVI are urgently needed for in-situ use in particular.

The influence of phosphorus compounds on the stability and reactivity of NZVI was also investigated in two scientific publications by Lowry et al. (Y. Liu, T. Phenrat, G. V. Lowry: Effect of TCE Concentration and Dissolved Groundwater Solutes on NZVI-Promoted TCE Dechlorination and $H_2$ Evolution. Environ. Sci. Technol. 2007, 41, 7881-7887. B. Reinsch, B. Forsberg, R. Leepenn, C. Kim, G. V. Lowry: Chemical Transformations during Aging of Zerovalent Iron Nanoparticles in the Presence of Common Groundwater Dissolved Constituents. Environ. Sci. Technol. 2010, 44, 3455-3461). According to this, however, phosphate additives inhibit the dechlorination of CHCs, while the stability of the NZVI cannot be improved significantly—i.e., there is no improvement in the practical usability of ZVI.

In addition, it is known in the literature that iron, sulfur and carbon can be combined to create reactive particles suitable for degradation of pollutants in water. Thus, U.S. Patent Application 20090191084 A1 (2009), for example, discloses a ZVI material modified with graphite (>4 wt %) and sulfur (>0.5 wt %) to improve its reactivity and selectivity as a reagent in the purification of water. An improvement in selectivity here is understood to mean influencing the reaction mechanism (from direct electron transfer [hydrogenolysis] to H transfer: examples: TCE and 1,1,1-TCA) aimed at the smallest possible amount of unwanted, partially dechlorinated reaction products in the degradation of CHCs (e.g., the smallest possible amount of cis-dichloroethene from trichloroethene). An improvement in reactivity is understood to be a general increase in reactivity ("to enhance corrosivity and reactivity of the iron"). Carbon and sulfur were added to increase the corrosion and reactivity (rate of contaminant reduction) of the iron when treating large volumes of dirty water, contaminated groundwater and surface water. In other words, modification of ZVI should cause a general increase in the reactivity of the iron to be able to treat contaminated water in conventional aboveground reactors at the highest possible throughput.

All known measures thus result either in rapid corrosion of iron, hardly improved stability or inhibited dechlorination of CHCs in bodies of water.

SUMMARY

Therefore, the object of the invention is to provide a corrosion-resistant, reactive agent that overcomes the two disadvantages of ZVI, namely inactivity as an adsorbent for hydrophobic pollutants such as CHCs and a relatively short lifetime. The material should be usable for in-situ treatment of contaminated groundwater in particular. Therefore, adsorptive enrichment of the pollutants, which are usually present in great dilution in the water to be purified, and a long lifetime of the reactive component, i.e., the iron of the ZVI in particular, is essential in the aquifer.

This problem has surprisingly been solved according to the invention by providing a material based on a basic composite material of carbon as the adsorbent and iron in nanoparticulate form as the reducing agent, treated with sulfur and phosphorus additives.

The subject matter of the invention is therefore a reactive adsorbent consisting of carbon (C), zero-valent iron)($Fe^0$ in nanoparticulate form, sulfur (S) and phosphorus (P) as well as methods of producing same and use thereof.

The reactive adsorbent preferably contains 10 to 40 wt % zero-valent iron in nanoparticulate form, 40 to 70 wt % carbon, 0.01 to 5 wt % P and 0.01 to 5 wt % S, especially preferably 0.1 to 2 wt % P and 0.1 to 2 wt % S. A typical material contains 25-30% Fe in nanoparticulate form, 60-65% C and small amounts of P and S (0.1 to 1%).

To produce the reactive adsorbent for treatment of commercial bodies of water, zero-valent iron in nanoparticulate form (i.e., in a finely divided form) is created on a carbon carrier and converted to a reactive form that is a corrosion-resistant form at the same time by combined treatment with phosphorus and sulfur compounds in aqueous suspension.

By adding phosphorus compounds as stabilizers to a material comprised of elemental iron (ZVI) and carbon treated with sulfur compounds, the reactive adsorbent according to the invention combines the reducing power of ZVI with the positive effects of S-doped and C-based carrier material while avoiding the known negative effects. A basic composite material of ZVI, preferably in NZVI, and a porous non-graphitized carbon-based carrier material with very low electrical conductivity is produced and treated with sulfur and phosphorus compounds by a suitable method. Activated carbon preferably functions as the carrier material here.

It has surprisingly been found that this reactive adsorbent has a very low corrosion rate and also a high dechlorination activity. This is in contrast with the publications by Lowry et al. (2007, 2010), which describe inhibition of dechlorination of CHCs after phosphate treatment of NZVI material.

From a phenomenological standpoint, the properties of the reactive adsorbent according to the invention can be described as the surface of the iron particles on the carbon carrier being protected from corrosion by a Fe—S—P shell while the reducing power of the iron is transferred to the carrier by direct contact with the carrier material. The carrier material, preferably activated carbon, has a very high sorption affinity and sorption capacity for hydrophobic pollutants, in particular for CHCs, so that the pollutant to be eliminated is enriched at its surface. This adsorptive enrichment increases the overall reaction rate. The precise transfer mechanism between the modified ZVI and the carrier material is unknown. However, the fact that the hydrogen overpotential on amorphous carbon is higher than that on iron surfaces is important, and therefore the water dissociation/iron corrosion on the material is effectively inhibited. Furthermore, the drastic increase in dwell time of the pollutant in/on the reagent due to sorptive binding on the carbon carrier is important for the use properties of the new reactive adsorbent material. Therefore, a partial reduction in the specific reactivity of the surface-modified ZVI in favor of its long-term stability can be accepted without any significant disadvantages in terms of overall performance.

This method for producing the reactive adsorbent according to the invention is characterized in that a basic composite material, comprised of zero-valent iron in nanoparticulate form is produced on a carbon carrier, which is then subjected to a treatment with phosphorus and sulfur compounds combined.

To create the basic composite material of carbon and ZVI, preferably NZVI, any carbon carrier, preferably activated carbon, especially preferably powdered activated carbon (PAC) with a particle size of 0.5 to 50 µm, is loaded with an iron compound, preferably an iron(III) compound, usually by wet impregnation, and then dried. This is followed by a thermal treatment, preferably in a stream of nitrogen or in a stream of nitrogen and a stream of hydrogen. The thermal treatment may be carried out at temperatures up to 800° C. If the thermal treatment is carried out only in a stream of nitrogen, then temperatures up to 750° C. are preferably selected. When carrying out the method using a combined nitrogen stream and a subsequent nitrogen stream, temperatures up to 550° C. are chosen. The method is then preferably carried out in stages, such that after the treatment in a stream of nitrogen up to 350° C., the treatment is carried out in a stream of hydrogen up to 550° C. (Bleyl et al. in Chemical Engineering Journal, 2012).

Next, the basic composite material is transferred to an oxygen-free aqueous suspension, where it is treated with dissolved phosphorus compounds and dissolved sulfur compounds simultaneously or in succession. The aqueous suspension of the basic composite material can be prepared by adding deionized water, for example, so that in a first step, an approximately neutral medium is preferably established at a pH in the range of 5.5 to 8, especially preferably in a range of 6.5 to 7.5.

In the second step, phosphorus compounds (preferably in a weight ratio of P to solids of 0.1 to 5 wt %) and sulfur compounds (preferably in a weight ratio of S to solids of 0.1 to 5 wt %) are added. The order in which the phosphorus and sulfur compounds are added is irrelevant because mixed compounds are formed, consisting essentially of (P-perturbed) iron-sulfur compounds (i.e., iron sulfides with P impurities). Therefore, the phosphorus compound may be added to the suspension first, and then after a reaction time of preferably at least 10 minutes, the sulfur compound is added or vice versa. The pH is shifted to the alkaline range with the addition of phosphorus and sulfur compounds (depending on the reaction time, as far as pH 10 after 10 min to 3 hours). Then the solids are removed and freed of residues of the dissolved phosphorus and sulfur compounds by washing several times, preferably with deionized water. A pH of 8 to 10 is preferably maintained.

Examples of phosphorus compounds that may be used include orthophosphates, polyphosphates, pyrophosphates or metaphosphates, preferably dibasic sodium phosphate. Water-soluble sulfides, dithionites or dithionates, preferably sodium sulfide, may be used as the sulfur compounds.

The function of the sulfur and phosphorus additives in the reactive adsorbent thus created consists of passivation of the ZVI surface against unwanted iron corrosion in an aqueous medium. It is known that sulfidic sulfur results in the formation of iron sulfide and, at high sulfur concentrations, also results in the formation of pyrite on the ZVI surface. However, the long-term stability of these layers, which are formed exclusively by addition of sulfur, is limited (Hanssen et al., 2008). It has surprisingly been found here that the long-term stability of the ZVI is improved significantly by combining sulfur additives with phosphorus additives.

The two disadvantages of ZVI, namely the inactivity for hydrophobic pollutants and the relatively short lifetime, are overcome with the reactive adsorbent according to the invention. When ZVI is combined with environmentally friendly additives, it results in stabilization of ZVI with respect to corrosion in aqueous media without at the same time losing its reactivity for degradation of pollutants. The combined phosphorus-sulfur treatment influences both the stability and reactivity of the ZVI carbon-based composite material in a positive sense. The joint effects of phosphorus and sulfur compounds result in a long-term corrosion resistance and nevertheless a reactive iron surface. A corrosion-resistant, reactive adsorbent is therefore made available over the lifetime of the iron. The given aspects of the respective site determine the lifetime of the iron. If a great many pollutants must react, the iron is also consumed more rapidly. The active lifetime of the reactive adsorbent may be three months at one location but several years at another location.

The reactive adsorbent according to the invention is thus excellent for use in treating contaminated bodies of water over a long period of time, in particular for dechlorination of chlorohydrocarbon compounds in groundwater.

Details of the synthesis of the reactive adsorbent according to the invention and its use are described in the following exemplary embodiments.

DETAILED DESCRIPTION

Exemplary Embodiments

Example 1

Reduction of a Basic Composite Material
a) A commercial powdered activated carbon (PAC, particle size: 0.5 to 50 µm) is loaded with iron(III) nitrate in a PAC-to-Fe weight ratio of 3:1 by wet impregnation from an aqueous solution. Loaded and predried PAC is then first reduced by stepwise heating in a stream of nitrogen, then reduced in a stream of hydrogen at temperatures up to 550° C., while the following chemical reactions take place:

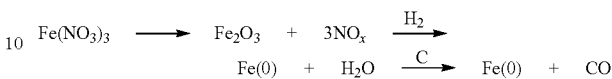

The result is a reactive adsorbent, comprised of 25 wt % $Fe^0$ and 68 wt % C with 7 wt % residues (consisting primarily of iron oxides).

The resulting pyrophoric powder containing iron particles in finely divided form in and on the carbon carrier, is transferred to water bubbled with nitrogen and treated further in various ways.

b) By analogy with "a) reduction in a stream of hydrogen," reduction in a stream of nitrogen was carried out at temperatures up to 750° C., with the carbon of the carrier material PAC acting as the reducing agent in this variant.

The result is a reactive adsorbent of 28 wt % $Fe^0$, 62 wt % C and 10 wt % residues (consisting primarily of iron oxides).

c) Stability testing of the basic composite material

ZVI-C basic composite material (prepared according to Example 1a) was stored at an approximately neutral pH in tapwater (10 g/L) bubbled with nitrogen while agitating gently. The ZVI corrosion was tracked continuously by measuring the hydrogen formed. After 10 days, the supernatant water was decanted, and the moist residue was mixed with concentrated hydrochloric acid. In doing so, all the iron compounds dissolved. Hydrogen was formed from metallic iron according to the equation $Fe^0 + 2\ HCl \rightarrow H_2 + FeCl_2$. The volume of the hydrogen was determined and used as a measure of the ZVI still present at the respective point in time. After storing for two weeks in an aqueous suspension, approx. 75% of the original ZVI content of 25 wt % could still be detected. After another 4 weeks, 50% of the original content was still detectable, and 20% after two months. The corrosion rate of the ZVI can be described with its half-life ($t_{50\%\_ZVI}$) as a stability parameter. The stability of this batch with respect to anaerobic corrosion at $t_{50\%\_ZVI}$ of approx. 6 weeks is still not sufficient for the desired active period of a few months to years.

In parallel with the stability test, a reactivity test was also carried out with this batch (prepared according to Example 1a). The ZVI-C basic composite material in a concentration of 1 g/L in aqueous suspension (deionized water) was mixed with 10 mg/L tetrachloroethene (PCE) for this purpose and agitated gently but continuously in a sealed reaction vessel. The concentrations of PCE and chloride ions in solution were determined by analysis by gas chromatography and ion chromatography. PCE was removed from the aqueous solution quickly and almost completely by adsorption on the composite material. Then a dechlorination reaction took place, and was tracked on the basis of the increase in the chloride concentration and the occurrence of gaseous chlorine-free hydrocarbons, in particular ethene and ethane, as products of complete dechlorination. Dechlorination approximately conforms to first-order kinetics and will be described on the basis of the half-life parameter ($t_{50\%\_PCE}$, reaction time for a 50% conversion of PCE). The half-life of the PCE under the conditions described was $t_{50\%\_PCE}$ approx. 12 days.

Example 2

Preparing a Basic Composite Material Treated with Sulfur (Comparative Example)

Basic composite material ZVI-C (prepared according to Example 1a) was transferred to deionized water bubbled with nitrogen (10 g/L) and agitated moderately for 24 hours after adding 100 mg/L sodium sulfide ($Na_2S$ nonahydrate). Next, the solids were removed by decanting and were freed of the remaining dissolved sulfide by washing several times with deionized, degassed water.

The result was a reactive adsorbent of 24 wt % $Fe^0$, 68 wt % C, approx. 0.15 wt % S and the remainder iron oxides.

The material treated with sulfur was suspended in tapwater and tested for corrosion resistance and dechlorination reactivity, as described in Example 1c. Initially only a slight formation of hydrogen was measured due to iron corrosion (4% of the maximum value after two weeks). However, then the iron corrosion accelerated progressively, reaching approx. 90% of the maximum value after a total of 10 weeks. For the period of accelerated ZVI corrosion, the half-life $t_{50\%\_ZVI}$ amounted to only approx. 1 week.

In contrast with anaerobic corrosion, the sulfur treatment did not have a significant effect on the initial dechlorination activity of the composite material. PCE was dechlorinated from the beginning with a half-life $t_{50\%\_PCE}$ of approx. 14 days. However, its degradation was further accelerated in the accelerated ZVI corrosion phase ($t_{50\%\_PCE}$ approx. 5 days).

As indicated above, a plain sulfur treatment causes only temporary stabilization of the basic composite material. Then there is accelerated ZVI corrosion, leading to an unsatisfactory overall lifetime of the material.

Example 3

Preparing a Basic Composite Material Treated with Phosphorus (Comparative Example)

Basic composite material ZVI-C (prepared according to Example 1a) was transferred to deionized water bubbled with nitrogen as described in Example 2 (10 g/L) and then agitated moderately for 24 hours after adding 200 mg/L dibasic sodium phosphate. The pH was then shifted slightly to the basic range (to pH 8.5). Next, the solids were removed by decanting and the mixture was freed of the remaining dissolved phosphate by washing several times with deionized degassed water.

The result was a reactive adsorbent of 25 wt % $Fe^0$, 68 wt % C, approx. 0.2 wt % P and the remainder iron oxides.

The basic composite material ZVI-C treated with phosphorus was suspended in tapwater and tested for corrosion resistance and dechlorination reactivity as described in Examples 1c and 2.

The ZVI corrosion was not reduced significantly by the phosphate treatment. A half-life $t_{50\%\_ZVI}$ of approx. 5 to 6 weeks was measured. The dechlorination activity was reduced slightly to approx. 70% in comparison with the untreated material ($t_{50\%\_PCE}$=17 days).

As indicated above, a simple phosphate treatment does not have a positive effect on the stability and reactivity of the ZVI-C composite material.

Example 4

Preparing a Reactive Adsorbent According to the Invention by Treating the Basic Composite Material with a Phosphorus Compound and a Sulfur Compound Basic composite material ZVI-C (prepared according to Example 1a) was transferred to deionized water bubbled with nitrogen (10 g/L), as described in Examples 2 and 3, and then, after adding 200 mg/L dibasic sodium phosphate, and shortly after that, 100 mg/L sodium sulfide, it was agitated moderately for 24 hours. The pH was shifted slightly into the basic range (to pH 9). Then the solids were removed by decanting and freed of the remaining dissolved phosphate and sulfide by washing several times with deionized degassed water. The result was a reactive adsorbent of 24 wt % $Fe^0$, 68 wt % C, approx. 0.2 wt % P, approx. 0.15 wt % S and the remainder iron oxides.

The basic composite material ZVI-C treated with phosphorus and sulfur was suspended in tapwater and tested for corrosion resistance and dechlorination reactivity again as described in Examples 1c, 2 and 3.

Result

ZVI corrosion was greatly reduced through the combined phosphate-sulfide treatment. After a reaction time of 6 months in suspension in tapwater, the residual ZVI content was still 60% of the initial value. This corresponds to a half-life $t_{50\%\_ZVI}$ of approx. 7 months. No accelerated corrosion phase was observed, such as that described for the S-modified composite material in Example 2.

The dechlorination activity of the reactive adsorbent according to the invention was not influenced negatively by the combined S—P pretreatment. PCE was dechlorinated with a half-life $t_{50\%\_PCE}$=10 days. The persistently high dechlorination activity was demonstrated by repeated addition of PCE over the entire observation period of 6 months.

Example 5

Basic composite material ZVIC (prepared according to Example 1 b) was tested by analogy with example 4 both with and without (as in Example 1c) the addition of phosphorus and sulfur but with variations in the order of addition of the phosphorus and sulfur compounds:

a) As in Example 1c, 10 g/L basic composite material ZVI-C from Example 1 b was placed in deionized water at an approximately neutral pH, and its corrosion resistance was investigated and the material was subjected to a reaction test with PCE. Much like the basic composite material ZVI-C from Example 1a, a corrosion tendency as with an iron half-life of $t_{50\%\_ZVI}$ of approx. 6.5 weeks was found for the basic composite material ZVI-C prepared according to Example 1 b. Dechlorination of the PCE was also accomplished with first-order kinetics and a half-life of $t_{50\%\_PCE}$ of 12 days. It was thus found that the two basic composite materials ZVI-C prepared in Example 1 had a comparable initial reactivity.

b) As in Example 4, the basic composite material ZVI-C (prepared according to Example 1 b in a stream of nitrogen at 750° C.) was stabilized with phosphorus and sulfur compounds. To do so, the procedure described in example 4 was selected but first the 100 mg/L sodium sulfide was added to the 10 g/L reactive adsorbent and 200 mg/L dibasic sodium phosphate was added after an interval of 10 minutes and then agitated moderately for 24 hours. After decanting the solids and washing with deionized, degassed water several times, the reactive adsorbent was found to contain 26 wt % $Fe^0$, 63 wt % C, approx. 0.2 wt % P, approx. 0.15 wt % S and residues of iron oxides.

The material was subjected to corrosion tests and dechlorination tests, which show as, in Example 4, that the combined use of phosphorus and sulfur additives definitely has a positive effect on the long-term stability of the reactive adsorbent, while maintaining its dechlorination activity. The corrosion was greatly suppressed. The half-life of iron $t_{50\%\_ZVI}$ in tapwater was slightly longer than 6 months (residual $Fe^0$ content still amounting to 53% of the starting value). The dechlorination activity with respect to PCE was even somewhat higher than that found in Example 4. The half-life $t_{50\%\_PCE}$ for the first addition of PCE was found to be 8.5 days. The half-life of the pollutant for each of the two additional PCE additions was 9 days.

The results in Examples 4 and 5b can be assessed as similar. In both experiments, the advantage of the combined addition of phosphorus and sulfur to the basic composite material ZVI-C can be recognized. In each case, it was found that the corrosion tendency of the iron metal was greatly reduced, but the rate of dechlorination was at least approximately the same. Thus, the iron component in the composite material can be utilized much more effectively for the target reaction (i.e., dechlorination) and increases the lifetime of the purification material for the water purification.

What is claimed is:

1. A corrosion-resistant, reactive adsorbent containing nanoparticles of zero-valent iron on a carbon carrier, and a coating of sulfur and phosphorus on surfaces of the nanoparticles of zero-valent iron.

2. The reactive adsorbent according to claim 1, characterized in that the reactive adsorbent contains 10 to 40 wt % zero-valent iron, 40 to 70 wt % carbon, 0.01 to 5 wt % P and 0.01 to 5 wt % S.

3. The reactive adsorbent according to claim 2, characterized in that the reactive adsorbent contains 0.1 to 2 wt % P and 0.1 to 2 wt % S.

4. A method for producing a reactive adsorbent according to claim 1, characterized in that a basic composite material of zero-valent iron in nanoparticulate form is created on a carbon carrier and is converted to a form that is reactive and corrosion-resistant at the same time by treatment with phosphorus and sulfur compounds in aqueous suspension.

5. The method according to claim 4, characterized in that to create the basic composite material, the carbon carrier is loaded with an iron compound by wet impregnation, and then the iron is reduced to zero-valent iron in a nanoparticulate form by thermal treatment after drying.

6. The method according to claim 5, characterized in that a water-soluble iron(III) compound is used as the iron compound for impregnation.

7. The method according to claim 4, characterized in that the basic composite material is transferred to an oxygen-free aqueous suspension, and the suspension is then treated with dissolved phosphorus compounds and dissolved sulfur compounds.

8. The method according to claim 4, characterized in that water-soluble orthophosphates, polyphosphates, pyrophosphates or metaphosphates are used as the phosphorus compounds.

9. The method according to claim 4, characterized in that water-soluble sulfides, dithionites or dithionates are used as the sulfur compounds.

10. The method according to claim 4, characterized in that activated carbon is used as the carbon carrier.

11. The method according to claim 10, characterized in that powdered activated carbon (PAC) with a particle size of 0.5 to 50 µm is used as the carbon carrier.

12. A process of treating water contaminated with hydrophobic pollutants, the process comprising contacting a corrosion-resistant, reactive adsorbent according to claim 1 with the water contaminated with hydrophobic pollutants, in particular for to achieve dechlorination of chlorohydrocarbon compounds in the water contaminated with hydrophobic pollutants.

* * * * *